(12) United States Patent
Rea

(10) Patent No.: US 12,162,560 B2
(45) Date of Patent: Dec. 10, 2024

(54) THREE-WHEEL MOTOR VEHICLE AND CONTROL SYSTEM

(71) Applicant: Eric Rea, Seffner, FL (US)

(72) Inventor: Eric Rea, Seffner, FL (US)

( * ) Notice: Subject to any disclaimer, the term of this patent is extended or adjusted under 35 U.S.C. 154(b) by 0 days.

(21) Appl. No.: 18/214,769

(22) Filed: Jun. 27, 2023

(65) Prior Publication Data
US 2024/0375742 A1 Nov. 14, 2024

Related U.S. Application Data

(63) Continuation of application No. 17/460,515, filed on Aug. 30, 2021, now Pat. No. 11,753,105.

(51) Int. Cl.
| | | |
|---|---|---|
| *B62K 5/10* | (2013.01) | |
| *B60G 17/015* | (2006.01) | |
| *B60G 17/016* | (2006.01) | |
| *B62J 45/415* | (2020.01) | |
| *B62K 5/027* | (2013.01) | |
| *B62K 5/05* | (2013.01) | |
| *B62K 5/06* | (2006.01) | |

(Continued)

(52) U.S. Cl.
CPC ............ *B62K 5/10* (2013.01); *B60G 17/0157* (2013.01); *B60G 17/0162* (2013.01); *B62J 45/4151* (2020.02); *B62K 5/027* (2013.01); *B62K 5/05* (2013.01); *B62K 5/06* (2013.01); *B62K 5/08* (2013.01); *B62K 21/00* (2013.01); *B60G 2204/4193* (2013.01); *B60G 2204/62* (2013.01); *B60G 2300/122* (2013.01); *B60G 2400/0511* (2013.01)

(58) Field of Classification Search
CPC . B62K 5/027; B62K 5/05; B62K 5/06; B62K 5/08; B62K 21/00; B60G 17/0157; B60G 17/0162; B60G 2204/4193; B60G 2204/62; B60G 2300/122; B60G 2400/0511; B62J 45/4151
USPC ........................................................ 180/210
See application file for complete search history.

(56) References Cited

U.S. PATENT DOCUMENTS

| | | | |
|---|---|---|---|
| 5,406,778 A * | 4/1995 | Lamb ..................... | A01D 34/44 56/11.9 |
| 2011/0006498 A1* | 1/2011 | Mercier ................... | B62D 9/02 280/124.103 |

(Continued)

*Primary Examiner* — Amy R Weisberg
*Assistant Examiner* — Caitlin Anne Miller
(74) *Attorney, Agent, or Firm* — Nicholas Pfeifer; Smith & Hopen, P. A.

(57) ABSTRACT

A three-wheeled vehicle having a front wheel assembly attached to a chassis. The chassis includes a rotational control shaft having a rotational axis that is generally directed in a longitudinal direction of the vehicle. The rotational control shaft is integrated with or secured to the chassis in a non-rotational manner and passes through the front wheel assembly in a rotationally-free manner, such that the rotational control shaft can rotate about its rotational axis. The front wheel assembly includes one or more lean control motors, which are operably configured to rotate the rotational control shaft about its rotational axis thereby causing the chassis to lean from side to side to improve the handling ability of the vehicle. Some embodiments include a lean control system configured to automatically control the degree of rotation of the chassis.

19 Claims, 10 Drawing Sheets

(51) Int. Cl.
*B62K 5/08* (2006.01)
*B62K 21/00* (2006.01)

(56) References Cited

U.S. PATENT DOCUMENTS

| | | | |
|---|---|---|---|
| 2019/0144035 A1* | 5/2019 | Doerksen | B62K 5/10 280/124.103 |
| 2020/0283092 A1* | 9/2020 | Doerksen | B62M 6/50 |
| 2021/0179225 A1* | 6/2021 | Hara | B62K 5/10 |

* cited by examiner

THREE-WHEEL MOTOR VEHICLE AND CONTROL SYSTEM

CROSS-REFERENCE TO RELATED APPLICATIONS

This nonprovisional application is a continuation of and claims priority to nonprovisional application Ser. No. 17/460,515, entitled "THREE-WHEEL MOTOR VEHICLE AND CONTROL SYSTEM," filed Aug. 30, 2021 by the same inventor.

BACKGROUND OF THE INVENTION

1. Field of the Invention

This invention relates, generally, to vehicles. More specifically, it relates to three-wheel vehicles.

2. Brief Description of the Prior Art

Three-wheel vehicles (also referred to as "trikes") are notoriously unstable and have poor turning capabilities. This characteristic is a result of the inability to lean the vehicle into turns. Instead, the centrifugal force imparted on the vehicle while turning into a corner (also referred to as "cornering") often causes the wheel on the inside of the turn to come off the ground. Obviously, it can be dangerous when a wheel is lifted off the ground during cornering, especially when cornering at a high rate of speed. If the driver is not careful the trike can flip.

Efforts have been made to improve the cornering abilities of trikes. However, these approaches have resulted in only minor improvements. For example, U.S. Pat. No. 10,435,104 to Terracraft Motors Inc. describes a complex system relying on a suite of sensors and a complicated front beam assembly. While Terracraft's trike is adapted to lean into turns, the trike can only up to about 20 degrees. Moreover, the lean is achieved by leaning the front wheels of the trike. This approach is reliant on a front wheel assembly comprised of A-Arms and wheels with a U-shaped contacting surface to allow the wheels to lean and maintain ground contact. Ultimately, the Terracraft trike is overly complex and provides less than optimal lean characteristics.

Accordingly, what is needed is an improved trike design and lean control system. However, in view of the art considered as a whole at the time the present invention was made, it was not obvious to those of ordinary skill in the field of this invention how the shortcomings of the prior art could be overcome.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved trike design and lean control system is now met by a new, useful, and nonobvious invention.

The novel structure of the three wheel motor vehicle includes a chassis having a front end and a rear end with a rotational control shaft proximate the front end of the chassis. The rotational control shaft has a rotational axis that is directionally oriented along a path generally extending from the front end of the chassis to the rear end of the chassis. The chassis also provides structural support for a motor/engine, driver's seat, and vehicle controls.

In some embodiments, the rotational axis of the rotational control shaft is directionally oriented such that the rotational axis intersects a ground surface at or before an area of contact of a rear drive wheel with the ground surface. In some embodiments, the rotational axis of the rotational control shaft is directionally oriented such that the rotational axis intersects a ground surface aft of an area of contact of a rear drive wheel with the ground surface.

The vehicle further includes a front wheel assembly. The front wheel assembly includes a pair of wheels, a beam extending between the pair of wheels, and a first lean control motor operably coupled to the rotational control shaft of the chassis, such that actuation of the first lean control motor causes rotation of the chassis about the rotational axis of the rotational control shaft.

In some embodiments, the first lean control motor is a rotational motor with a rotational shaft. The rotational shaft of the first lean control motor is mechanically connected to or integrated with the rotational control shaft of the chassis.

Some embodiments further include a worm drive gear assembly structurally supported by the front wheel assembly. The worm drive gear assembly includes a first input shaft operably connected to the first lean control motor and an output shaft operably connected to the rotational control shaft of the chassis. The first input shaft is operably coupled with the output shaft via a worm screw meshed with a worm wheel. Thus, operation of the first lean control motor causes rotation of the first input shaft and in turn causes rotation of the output shaft and the rotational control shaft of the chassis.

In some embodiments, the worm drive gear assembly further includes a second input shaft operably connected to a second lean control motor. The second input shaft is operably coupled with the output shaft via the worm screw meshed with the worm wheel. Thus, operation of the second lean control motor causes rotation of the second input shaft and in turn causes rotation of the output shaft and the rotational control shaft of the chassis. In some embodiments, the gear assembly is self-locking meaning that the worm wheel cannot drive the worm screw, or in other words, the gear assembly prevent back driving.

Some embodiments of the present invention further comprise a lean control system. The lean control system includes a lean indicator sensor and control circuitry. The lean indicator sensor is calibrated to identify a normal plane of the chassis, wherein the normal plane extends from a bottom to a top of the chassis and is perpendicular to a lateral/cross axis of the chassis. The lean indicator sensor is also configured to detect a resultant force on the vehicle that is not parallel to the normal plane. The control circuitry is configured to read the outputs from the lean indicator sensor and control the operation of the first lean control motor. In addition, the control circuitry can determine the direction of the resultant force on the vehicle based on the outputs from the lean indicator sensor. In response to detecting that the resultant force on the vehicle is not parallel to the normal plane, the control circuitry is configured to cause the first rotational motor to rotate the rotational control shaft to rotate the chassis and its normal plane into parallel alignment with the resultant force.

Some embodiments of the present invention further include a cable steering system. The cable steering system has a steering wheel and a steering cable operably connected to the steering wheel and to one or more of the front wheels. Thus, input from the steering wheel causes the one or more front wheels to pivot about a respective king pin. Moreover, the cable steering system isolates steering inputs from the vehicle's leaning capabilities.

In some embodiments, each front wheel is secured to the front wheel assembly by a king pin and the kingpin has a longitudinal axis that is offset between 0 and 5 degrees from a vertical axis. In some embodiments, a suspension system is operably coupled to the front wheel assembly. The suspension system has a shock absorber and preferably a spring with a longitudinal axis that is offset between 20 and 25 degrees from the vertical axis.

In some embodiments, the front wheel assembly includes a first beam and a second beam operably coupled to the two front wheels, with the first beam vertically spaced from the second beam at the attachment point of the beams.

In some embodiments, the front two tires are wider and flatter than the rear drive wheel.

Some embodiments of the present invention include a front wheel assembly for a three wheel motor vehicle. The front wheel assembly includes a rotational control shaft configured to be mechanically secured to a chassis in a generally non-rotational manner, such that rotation of the rotational control shaft causes rotation of the chassis when the rotational control shaft is secured to the chassis. The rotational control shaft has a rotational axis that is directionally oriented along a path generally extending downwardly towards a ground surface in a rearward direction when the rotational control shaft is secured to the chassis.

The front wheel assembly further includes a first lean control motor operably coupled to the rotational control shaft of the chassis, such that actuation of the first lean control motor causes rotation of the chassis about the rotational axis of the rotational control shaft. In some embodiments, the first lean control motor is a rotational motor with a rotational shaft. The rotational shaft of the first lean control motor is mechanically connected to or integrated with the rotational control shaft.

Some embodiments further include a worm drive gear assembly structurally supported by the front wheel assembly. The worm drive gear assembly includes a first input shaft operably connected to the first lean control motor and an output shaft operably connected to the rotational control shaft. The first input shaft is operably coupled with the output shaft via a worm screw meshed with a worm wheel. Thus, operation of the first lean control motor causes rotation of the first input shaft and in turn causes rotation of the output shaft and the rotational control shaft.

In some embodiments, the worm drive gear assembly further includes a second input shaft operably connected to a second lean control motor. The second input shaft is operably coupled with the output shaft via the worm screw meshed with the worm wheel. Thus, operation of the second lean control motor causes rotation of the second input shaft and in turn causes rotation of the output shaft and the rotational control shaft. In some embodiments, the gear assembly is self-locking meaning that the worm wheel cannot drive the worm screw, or in other words, the gear assembly prevent back driving.

Some embodiments of the present invention further comprise a lean control system. The lean control system includes a lean indicator sensor and control circuitry. The lean indicator sensor is calibrated to identify a normal plane of the chassis, wherein the normal plane extends from a bottom to a top of the chassis and is perpendicular to a lateral/cross axis of the chassis. The lean indicator sensor is also configured to detect a resultant force on the vehicle that is not parallel to the normal plane. The control circuitry is configured to read the outputs from the lean indicator sensor and control the operation of the first lean control motor. In addition, the control circuitry can determine the direction of the resultant force on the vehicle based on the outputs from the lean indicator sensor. In response to detecting that the resultant force on the vehicle is not parallel to the normal plane, the control circuitry is configured to cause the first rotational motor to rotate the rotational control shaft to rotate the chassis and its normal plane into parallel alignment with the resultant force.

The front wheel assembly further includes a beam extending in generally a perpendicular direction with respect to the rotational control shaft. The beam is configured to be operably secured to a pair of front wheels. In some embodiments, the front wheel assembly includes a first beam and a second beam operably coupled to the two front wheels, with the first beam vertically spaced from the second beam at the attachment point of the beams.

In some embodiments, each front wheel is secured to the front wheel assembly by a king pin and the kingpin has a longitudinal axis that is offset between 0 and 5 degrees from a vertical axis.

In some embodiments, a suspension system is operably coupled to the front wheel assembly. The suspension system has a shock absorber and preferably a spring with a longitudinal axis that is offset between 20 and 25 degrees from the vertical axis.

In some embodiments, the front wheel assembly is provided with a cable steering system. The cable steering system has a steering wheel and a steering cable operably connected to the steering wheel and to one or more of the front wheels. Thus, input from the steering wheel causes the one or more front wheels to pivot about a respective king pin. Moreover, the cable steering system isolates steering inputs from the vehicle's leaning capabilities.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized, and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The phrases "in some embodiments," "according to some embodiments," "in the embodiments shown," "in other embodiments," and the like generally mean the particular feature, structure, or characteristic following the phrase is included in at least one implementation. In addition, such phrases do not necessarily refer to the same embodiments or different embodiments.

The term "lateral force" refers to forces that are nonparallel to a vertical reference plane extending through the trike when the trike is stationary and upright. Lateral forces may be centrifugal forces, wind forces, or any other external force acting on the trike. When a lateral force is imparted on the vehicle, the vehicle experiences a resultant force in a direction based on the magnitude of the lateral force relative to the force of gravity.

Figure 1:
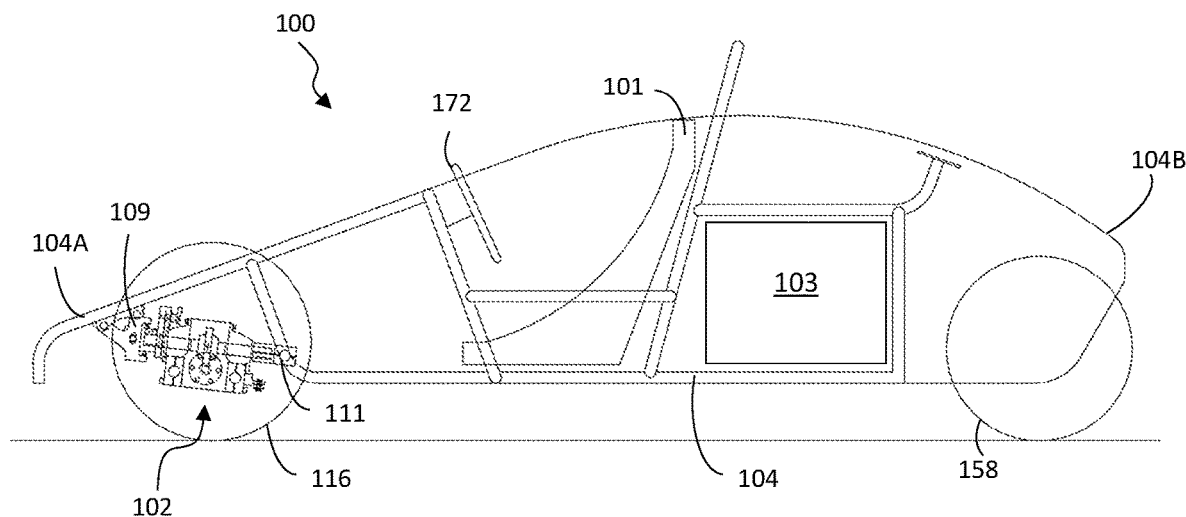
FIG. 1 is a side view of an embodiment of the present invention.
Figure 2:
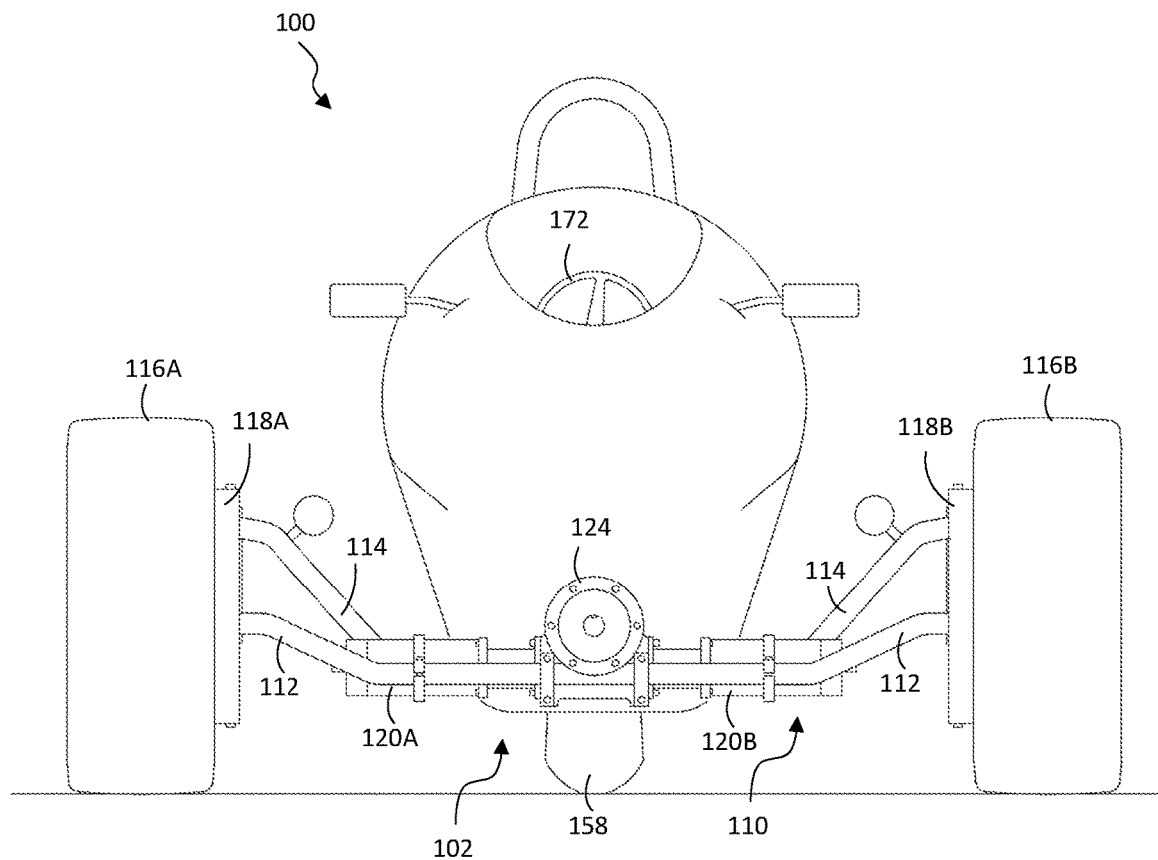
FIG. 2 is a front view of an embodiment of the present invention.
Figure 3:
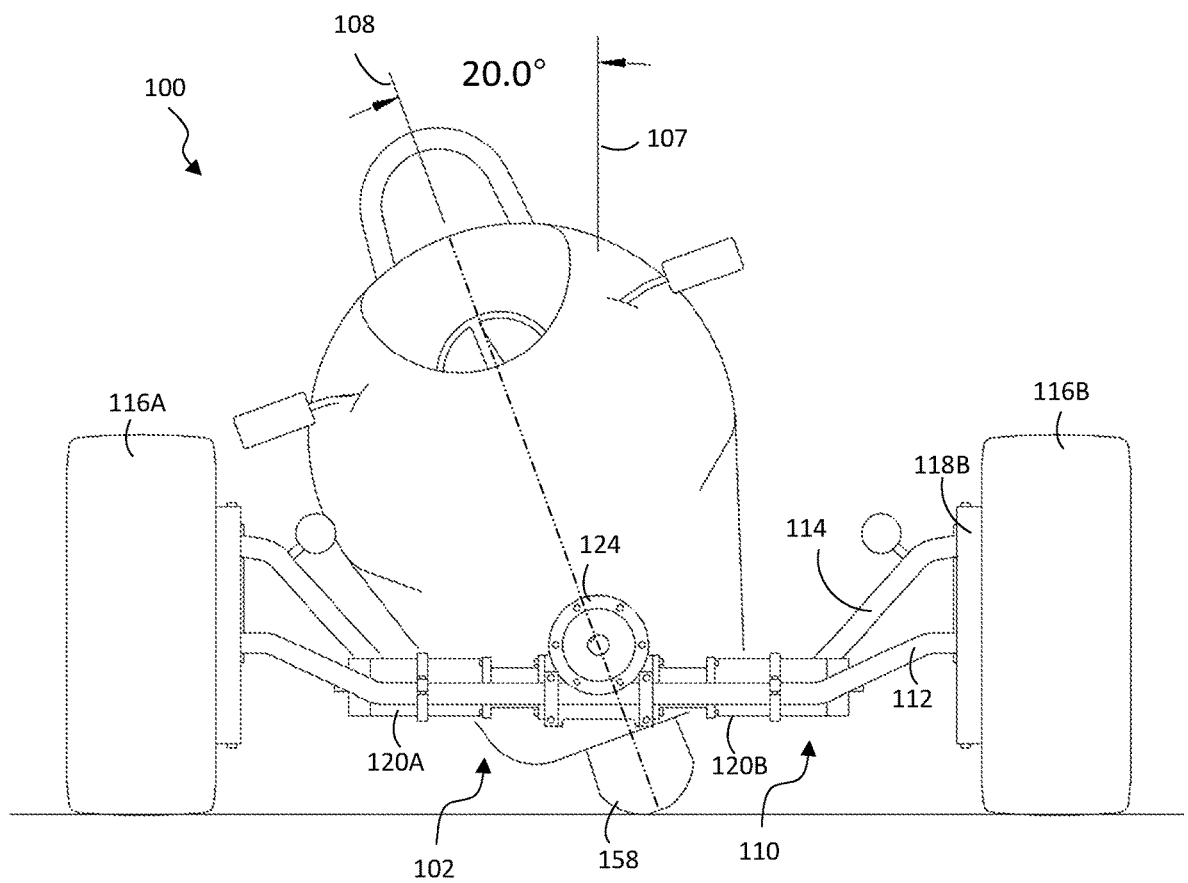
FIG. 3 is a front view of an embodiment of the present invention when leaning at a 20-degree angle.
Figure 4:
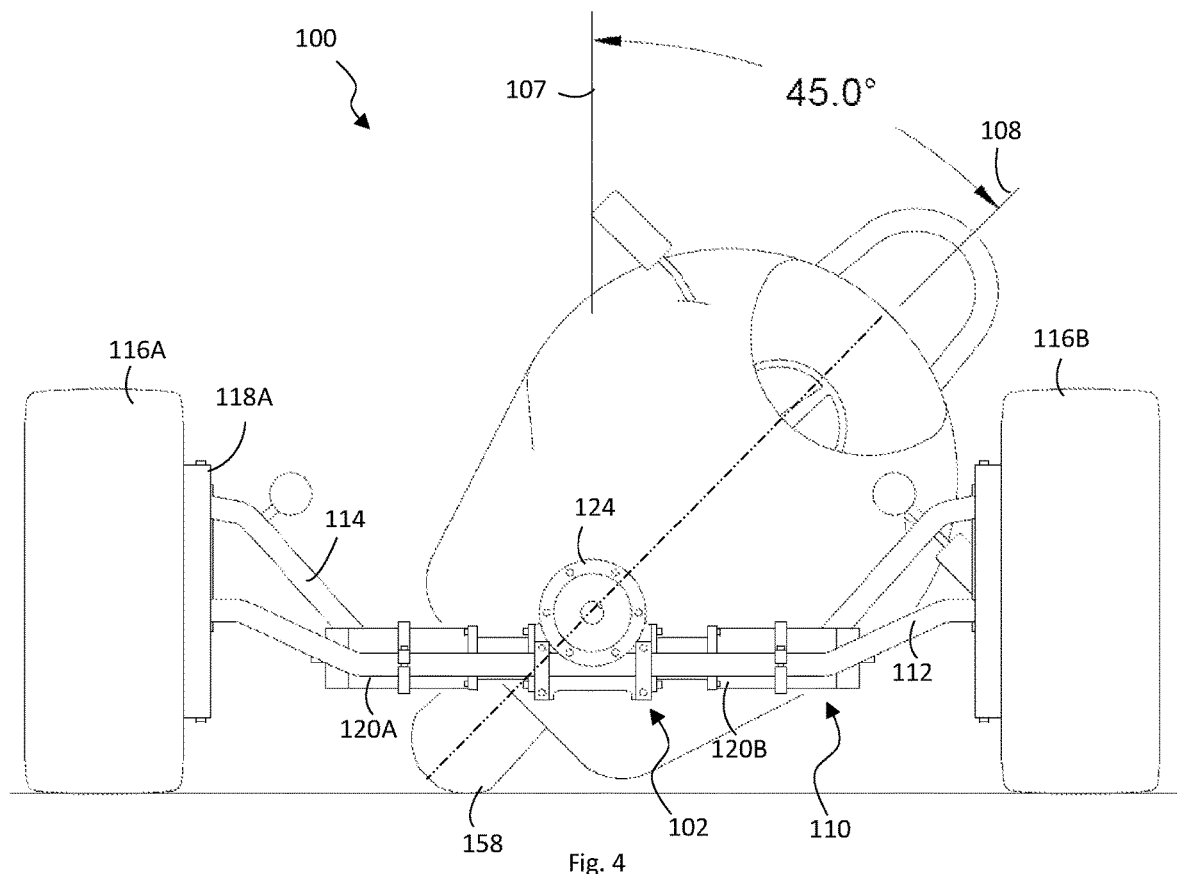
FIG. 4 is a front view of an embodiment of the present invention when leaning at a 45-degree angle.

The "vertical reference axis" is depicted in FIGS. 2-4 using reference numeral 107 and is parallel with the normal plane of the trike when the trike is stationary and in an upright orientation as depicted in FIG. 2.

The "normal plane" refers to a plane or axis extending from the top to the bottom of the trike. The normal plane is fixed with respect to the trike and rotates with the chassis as the chassis leans from side to side. The normal plane is depicted in FIGS. 2-4 using reference numeral 108.

While the exemplary figures provided herein do not depict various common features provided on motor vehicles, a person of ordinary skill in the art would understand that such features are included in various embodiments of the present invention. For example, embodiments of the present invention include one or more seats 101 for occupants, an engine/motor 103 for powering drive wheel 158, and vehicle control systems for controlling the various aspects of the vehicle, including but not limited to, acceleration, braking, and handling, and other common features found on vehicles, including but not limited to lights, mirrors, and turn signals. Furthermore, while the exemplary images depict a single seat trike, some embodiments include additional seats for multiple occupants. Some embodiments include no seats.

A shown in FIGS. 1-4, the present invention includes three-wheeled vehicle 100 (also referred to herein as a "trike") having a unique front wheel assembly 102 attached to a unique chassis 104. Front end 104A of chassis 104 includes rotational control shaft ("RCS") 105 (see e.g., FIGS. 5-6) having a rotational axis that is generally directed in a longitudinal direction, i.e., a direction extending from the front to the back of trike 100. RCS 105 is integrated with or secured to chassis 104 in a non-rotational manner. In some embodiments, RCS 105 is secured to chassis 104 via a forward structural mount 109 and a rearward structural mount 111.

RCS 105 is also passes through front wheel assembly 102 in a rotationally free manner, such that RCS 105 can rotate about its rotational axis. Front wheel assembly 102 includes one or more lean control motors 120, which are operably configured to rotate RCS 105 about its rotational axis thereby causing chassis 104 to lean from side to side to improve the handling ability of the vehicle.

As depicted in FIGS. 2-4, trike 100 is configured to operate in a generally vertical orientation and can lean from side to side. As will be explained in greater detail in subsequent paragraphs, some embodiments of the present invention include a lean control system ("LCS") configured to control the degree of rotation and when chassis 104 is rotated.

Front wheel assembly 102 further includes cross frame 110 spanning between front wheels 116A and 116B. As depicted, cross frame 110 includes a first beam 112 and a second beam 114. Some embodiments, however, may employ a single beam or more than two beams.

As best shown in FIGS. 2-4, in some embodiments, first beam 112 and second beam 114 attach to wheels 116A and 116B at different locations to reduce or prevent cross frame 110 from pitching during acceleration and deceleration. The exemplified embodiment includes first beam 112 and second beam 114 attached to suspension system 118A and 118B in a generally vertically offset configuration. However, some embodiments may include first beam 112 and second beam 114 operably connected to wheels 116A and 116B through alternative components and/or in non-vertical offsets.

Figure 5:
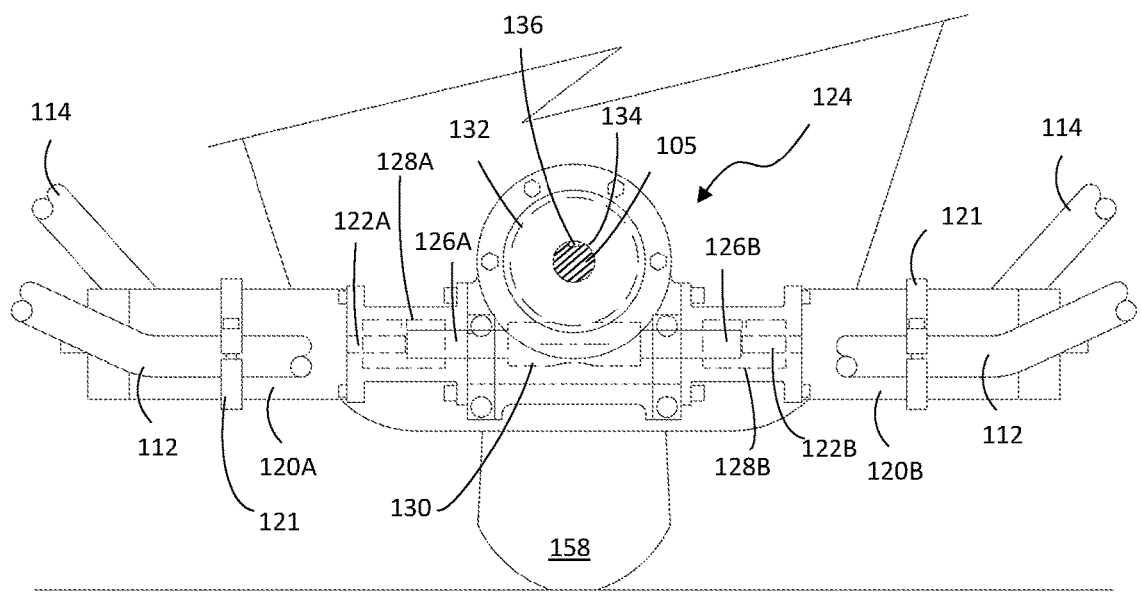
FIG. 5 is a front sectional view of an embodiment of the front end assembly.
Figure 6:
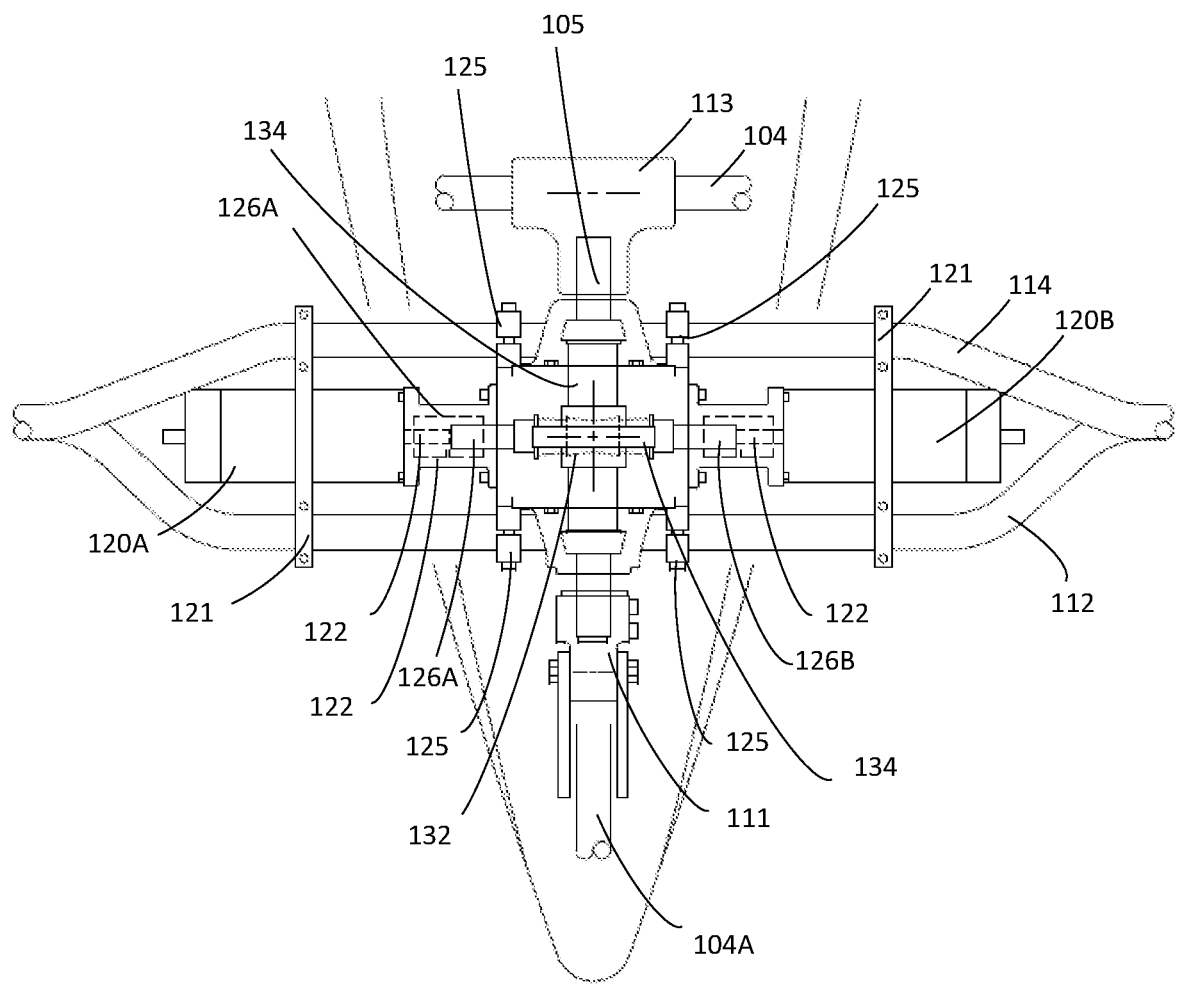
FIG. 6 is an overhead sectional view of an embodiment of the front end assembly.

Referring now to FIGS. 5-6, one or more lean control motors 120 are mounted to front wheel assembly 102 via mounts 121. As previously noted, lean control motors 120 operably engage RCS 105 of chassis 104. Lean control motors 120 may be any motor known to a person of ordinary skill in the art that is configured or configurable to impart a rotational force, directly or indirectly, onto RCS 105. In some embodiments, as depicted in FIGS. 5-6, lean control motors 120 are electric rotational motors having a rotational shaft 122. A power source (not shown) is operably connected to lean control motors 120 to provide the necessary power for operating said motors.

In some embodiments, one or more lean control motor(s) 120 are attached directly to RCS 105. In some embodiments, such as the one depicted in FIGS. 5-6, lean control motors 120 operably engage one or more intermediate components to rotate RCS 105. The depicted intermediate component is a worm gear assembly 124 mounted to front wheel assembly 102 via mounting supports 125. Worm gear assembly 124 includes two input shafts 126A and 126B operably connected to lean control motors 120A and 120B, respectively. Shafts 126A and 126B are connected to shafts 122A and 122B via mechanical coupler 128A and 128B, respectively. As a result, shafts 126A and 126B rotate as one with shafts 122A and 122B. In some embodiments, shafts 126A and 126B are integrated with shafts 122A and 122B or attached to each other through other components known to a person of ordinary skill in the art, such that shafts 126A and 126B rotate as one with shafts 122A and 122B, respectively. In some embodiments, the intermediate components are self-locking, or in other words, back driving is not possible.

Input shafts 126A and 126B are operably connected to worm screw 130. Typically, input shafts 126A and 126B are integrated with or directly connected to worm screw 130, such that rotation of input shafts 126A and 126B causes rotation of worm screw 130. Worm screw 130 includes a helical thread which meshes with a plurality of projections on worm wheel 132. This meshed connection transfers the rotational force imposed on worm screw 130 to worm wheel 132.

Worm wheel 132 is operably connected to output shaft 134. Output shaft 134 is integrated with or directly connected to worm wheel 132, such that rotation of worm wheel 132 causes rotation of output shaft 134.

Output shaft 134 is also operably connected to RCS 105. The depicted embodiments include a key/key slot connection 136. However, output shaft 134 may be mechanically connected to RCS 105 through a coupler, integrated with, or directly connected to RCS 105. Because of the interconnection of output shaft 134 and RCS 105, rotation of output shaft 134 causes rotation of RCS 134, which in turn causes rotation of chassis 104.

Some embodiments use alternative lean control motors and intermediate components known to a person of ordinary skill in the art to convert the output of the one or more lean control motors into rotation of RCS 105. Embodiments may also use alternative types of gears or other types of force transferring components that are in mechanical communication with RCS 105 to cause rotation of RCS 105 about its rotational axis.

Figure 7A:
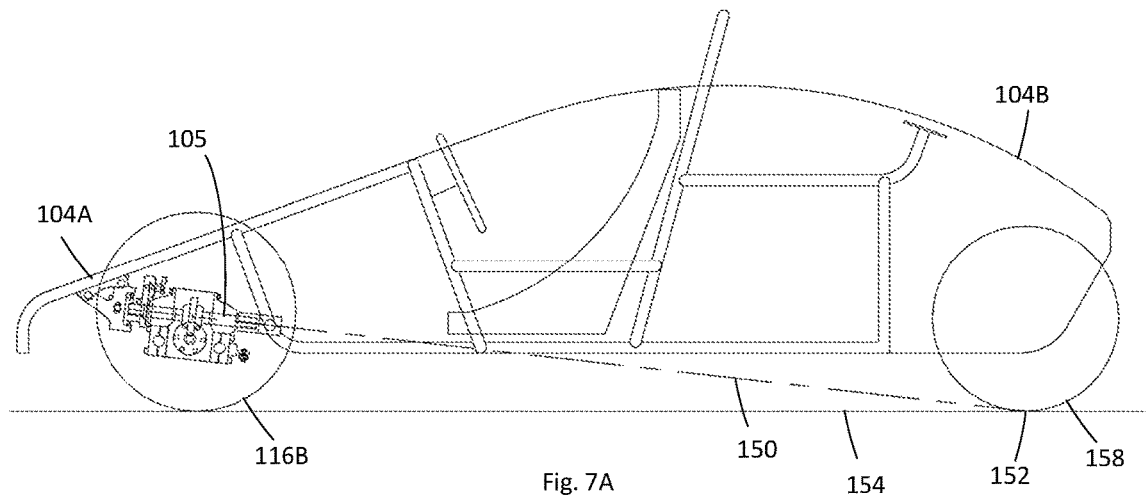
FIG. 7A is a side view of an embodiment of the present invention.
Figure 7B:
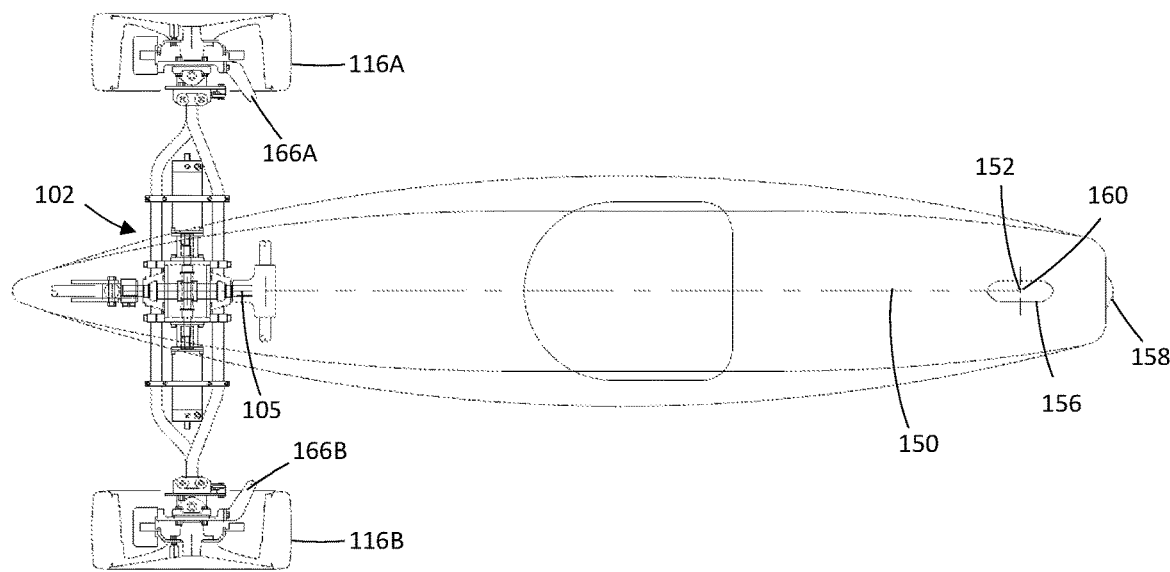
FIG. 7B is an overhead view of an embodiment of the present invention.
Figure 8A:
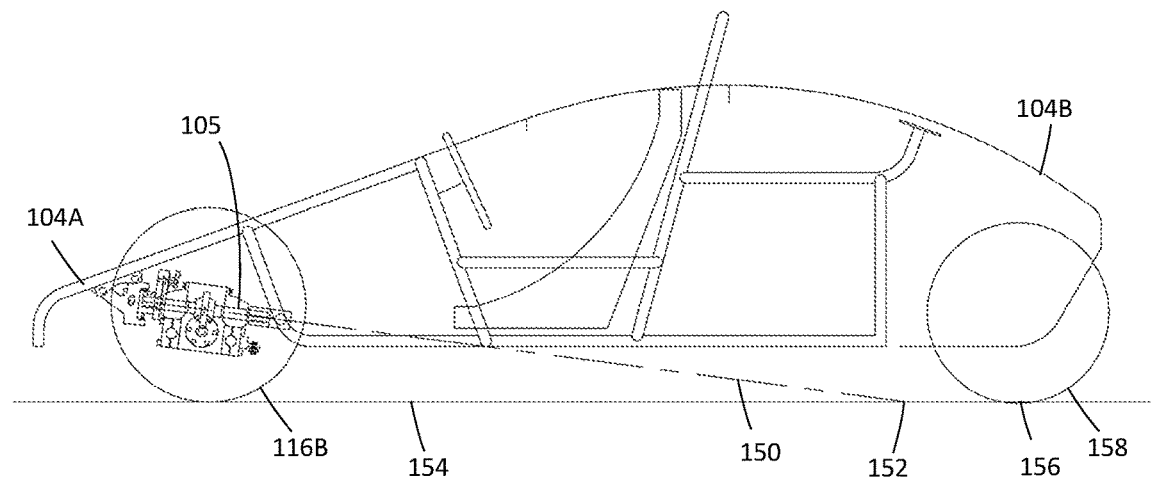
FIG. 8A is a side view of an embodiment of the present invention.
Figure 8B:
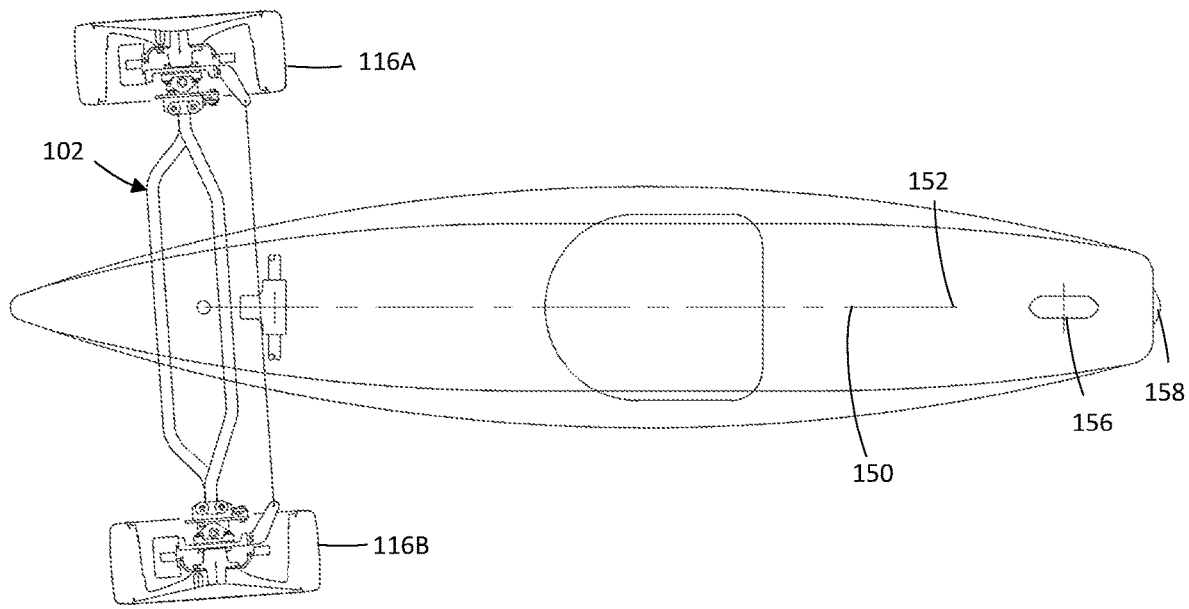
FIG. 8B is an overhead view of an embodiment of the present invention.
Figure 9A:
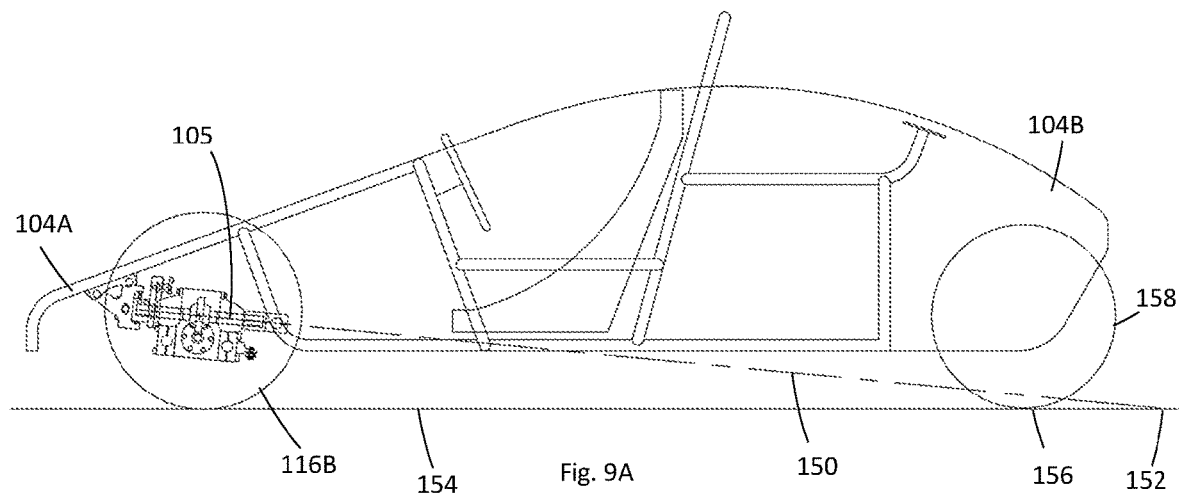
FIG. 9A is a side view of an embodiment of the present invention.

Referring now to FIGS. 7-9, embodiments of the present invention include rotational axis 150 of RCS 105 having a predetermined downward angle towards rear end 104B of chassis 104, such that the projection of rotational axis 150 has an intersection point 152 with ground 154. In some embodiments, intersection point 152 of rotational axis 150 is within contact area 156 of rear wheel 158 with ground 154. In some embodiments, as depicted in FIGS. 7, intersection point 152 of rotational axis 150 is at center point 160 of contact area 156 of rear wheel 158 with ground 154. This particular configuration eliminates or minimizes a turning moment on front wheel assembly 102, such that front wheel assembly 102 maintains a generally perpendicular orientation with chassis 104 when chassis 104 leans to a side. Moreover, this configuration ensures that trike 100 does not oversteer or understeer when chassis 104 is leaning during a turn.

In some embodiments, as shown in FIGS. 8, intersection point 152 of rotational axis 150 is located fore of contact area 156 of rear wheel 158 with ground 154. This particular configuration produces a turning moment force on front wheel assembly 102 when chassis 104 leans to a particular side. If chassis 104 leans to the port side, then a moment force is imposed on front wheel assembly 102 attempting to turn front wheel assembly 102 towards the port side of vehicle 100. As a result, this particular configuration causes trike 100 to have some oversteering characteristics when chassis 104 is leaning during a turn. FIG. 8B is a simplified illustration depicting how front wheel assembly 102 turns to the port side of trike 100 when chassis 104 initiates a port side lean. It should be noted that front wheel assembly 102 depicted in FIG. 8 is a simplified illustration to clarify how front wheel assembly 102 rotates in this configuration.

Figure 9B:
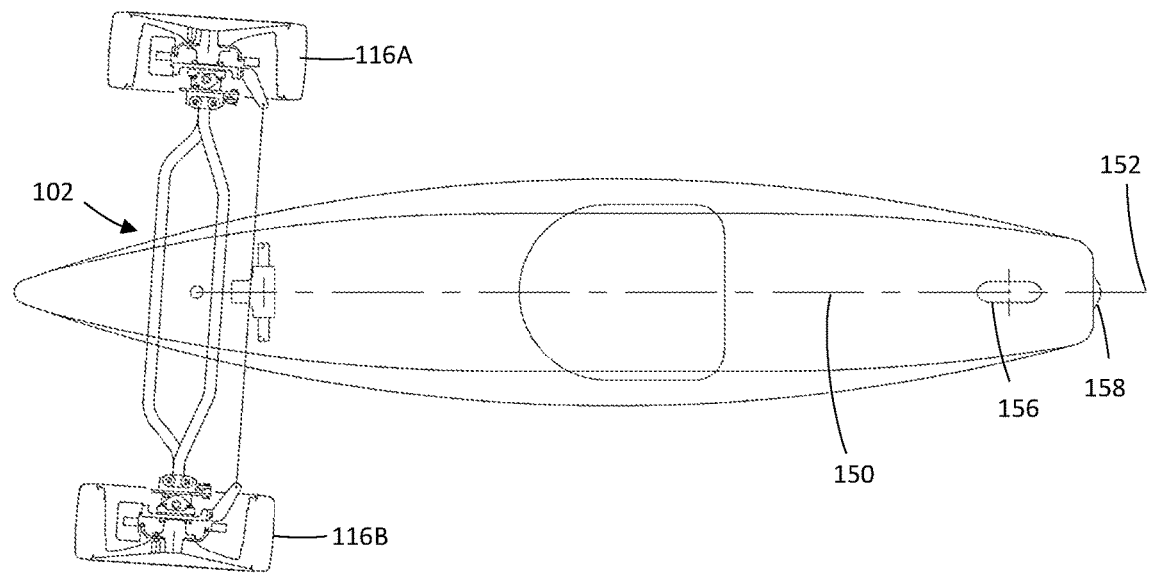
FIG. 9B is an overhead view of an embodiment of the present invention.

In some embodiments, as shown in FIGS. 9, intersection point 152 of rotational axis 150 is located aft of contact area 156 of rear wheel 158 with ground 154. This particular configuration produces a turning moment force on front wheel assembly 102 opposite to the direction in which chassis 104 leans. In other words, if chassis 104 leans to the port side, then front wheel assembly 102 experiences a turning moment force on front wheel assembly 102 attempting to turn front wheel assembly 102 towards the starboard side of vehicle 100. As a result, this particular configuration causes trike 100 to have some understeering characteristics when chassis 104 is leaning during a turn. FIG. 9B illustrates how front wheel assembly 102 rotates to the starboard side of trike 100 when chassis 104 initiates a port side lean. It should be noted that front wheel assembly 102 depicted in FIG. 9 is a simplified illustration to clarify how front wheel assembly 102 rotates in this configuration.

In some embodiments, RCS 105 is connected to chassis 104 in a pitch adjustable manner. In other words, rotational axis 150 of RCS 105 has an adjustable downward angle towards rear end 104B of chassis 104. Some embodiments include a pitch adjusting actuator to alter the pitch angle. In some embodiments a user can alter the pitch angle of RCS 105 based on user input/instruction. As a result, the vehicle can be tuned to have different steering capabilities based on the user's preference. In some embodiments, the pitch adjusting actuator can be used dynamically during operation of the trike to create a turning moment on the trike without using the steering wheel.

Figure 10:
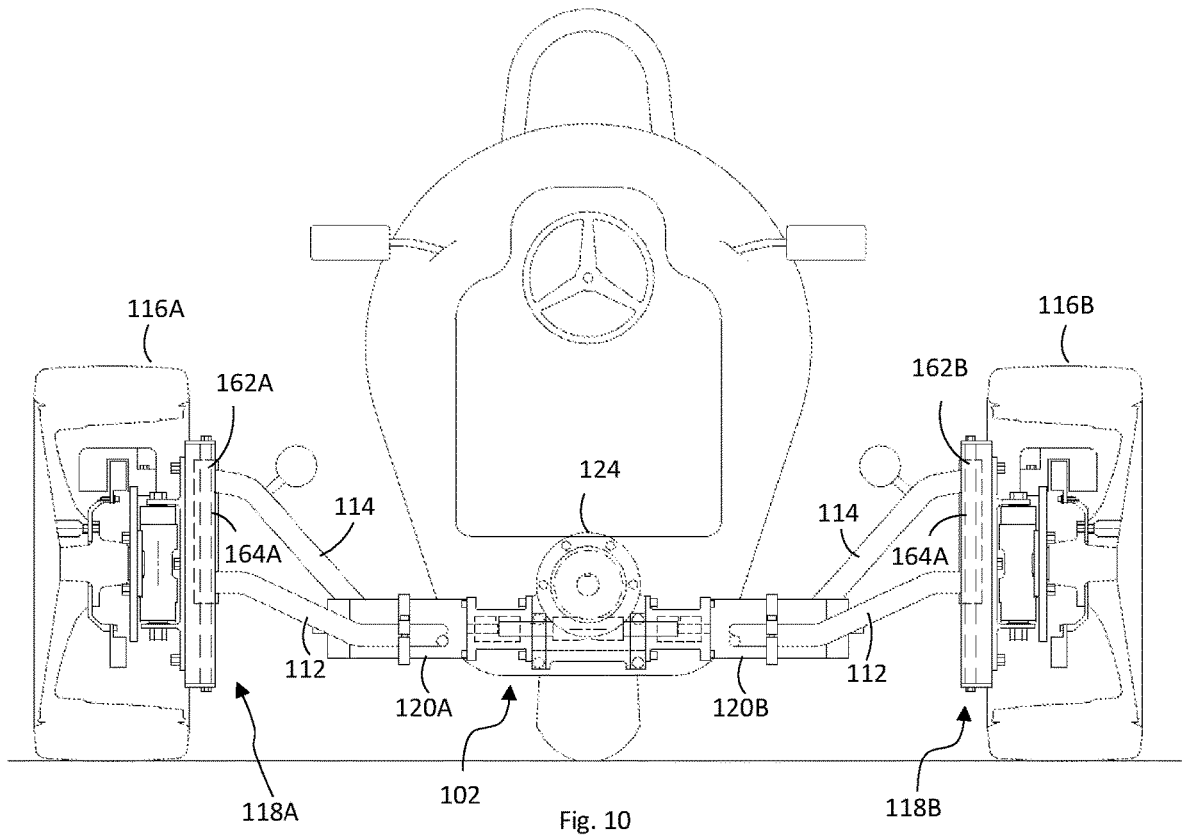
FIG. 10 is a front sectional view of an embodiment of the present invention.
Figure 11:
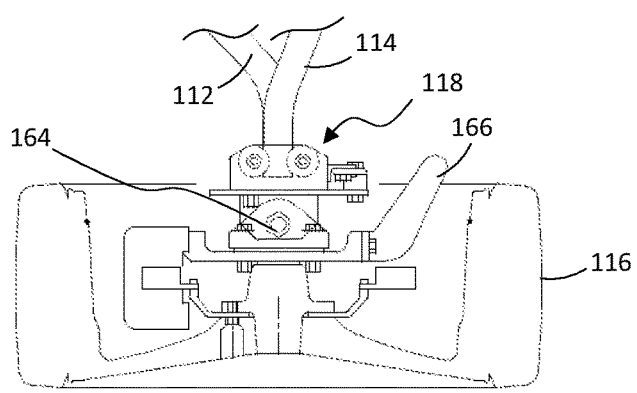
FIG. 11 is an overhead view of an embodiment of a front wheel.

Referring now to FIGS. 10-11 some embodiments of front wheel assembly 102 include suspension systems 118A and 118B at both front wheels 116A and 116B. Each suspension system 118 includes shock absorber 162, which may be any device, including but not limited to a mechanical or hydraulic device, designed to absorb and dampen shock impulses passing through the front wheels. Embodiments of suspension systems 118 also include springs that work in conjunction with shock absorbers 162.

Beams 112 and 114 are secured or integrated with translatable tube 164 in vertically spaced relation. Thus, beams 112 and 114 will translate in a generally vertical direction as shock absorbers 162 absorb forces. In some embodiments, the stroke length of the shock absorbers 162 is about 3 inches to about 24 inches.

While shock absorbers 162 allow for independent shock compression between the two front wheels, front wheel assembly 102 will generally maintain a parallel orientation with the ground surface regardless of how chassis 104 is leaning. Generally, the only tilt/rotation about the longitudinal axis of trike 100 of front wheel assembly 102 is contributed to the vertical movement of shock absorbers 162. Thus, during operation of trike 100, front wheels 116 operate more similar to car wheels than motorcycle wheels. In contrast, the ability of chassis 104 to lean results in rear wheel 158 leaning as well. Therefore, some embodiments of the present invention, as best depicted in FIGS. 2-4, use front wheels 116 that are generally flatter and wider than rear wheel 158. Rear wheel 158 has more of a U-shaped profile similar to motorcycle tires and front tires 116 have a profile shape more similar to tires meant for cars and trucks.

In some embodiments, shock absorbers 162 are vertically offset by a caster angle. This feature is exemplified in the simplified illustration of FIG. 12. In some embodiments, the caster angle of shock absorbers 162 is a positive caster. In some embodiments, the caster angle of shock absorbers 162 is between 15 and 20 degrees. In some embodiments, the caster angle of shock absorbers 162 is between about (i.e., +/-10%) 20 degrees. In some embodiments, the caster angle of shock absorbers 162 is adjustable to vary the suspension characteristics.

Figure 12:
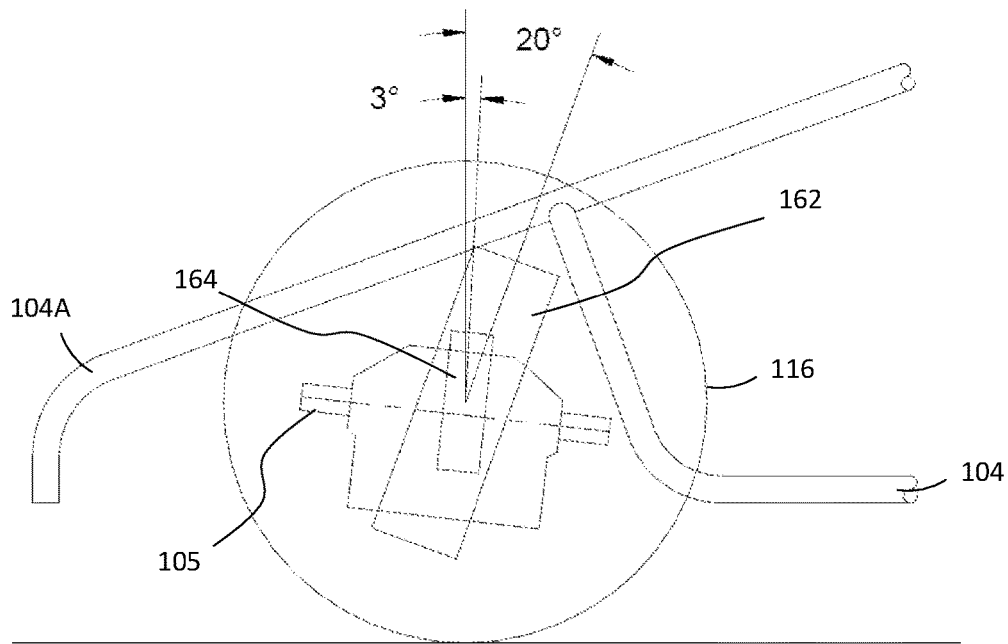
FIG. 12 is a side view of an embodiment of a front wheel depicting caster angles of the suspension system and steering kingpin.

In some embodiments, as depicted in FIGS. 11 and 12, each suspension system 118 is hingedly connected to its respective front wheel 116 via steering kingpin 164. Steering kingpin 164 provides the connection to which suspension system 118 is mechanically secured to steering control arm 166 and the pivot about which steering system 170 can control the orientation of front wheels 116 (see FIG. 13).

In some embodiments, steering kingpins 164 are vertically offset by a caster angle. This feature is also exemplified in the simplified illustration of FIG. 12. In some embodiments, the caster angle of steering kingpins 164 is a positive caster. In some embodiments, the caster angle of steering kingpins 164 is between 0 and 13 degrees. In some embodiments, the caster angle of steering kingpins 164 is between 0 and 5 degrees. In some embodiments, the caster angle of steering kingpins 164 is between about (i.e., +/-10%) 3 degrees. In some embodiments, the caster angle of steering kingpins 164 is adjustable to vary the steering characteristics. In some embodiments, the caster angle of steering kingpins 164 is distinct from the caster angle of shock absorbers 162.

Figure 13:
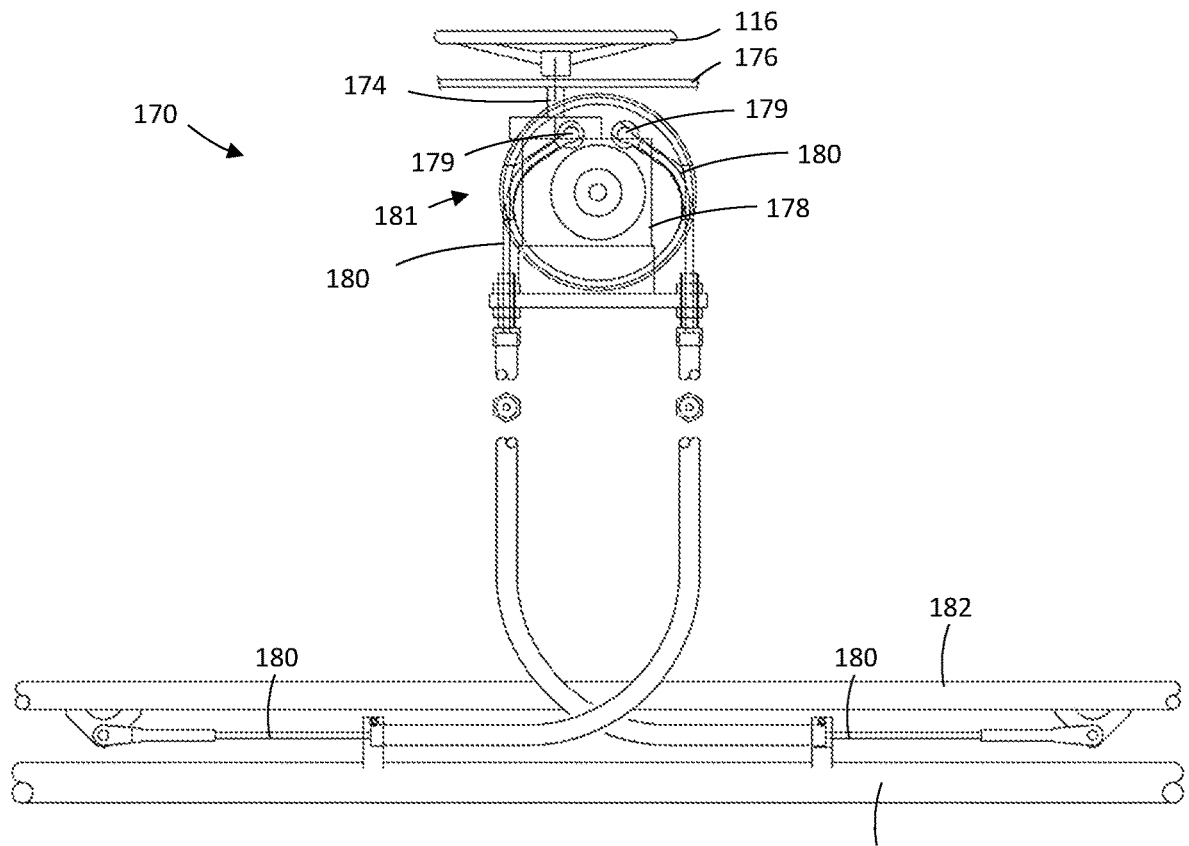
FIG. 13 is a simplified diagram of an embodiment of the steering system.

Some embodiments of the present invention also include cable steering system 170 as exemplified in FIG. 13. Steering system 170 is connected to steering wheel 172 via steering column 174, which passes through dash 176. Steering column 174 is operably connected to worm gearbox 178 housing worm gear assembly 181. The worm gear assembly 181 is operably connected to a pair of shank balls 179, which are operably connected to cables 180. Cables 180 are in turn secured to steering tie rod 182, which is operably connected to steering control arms 166. This particular steering system allows the cable steering system 170 to isolate steering inputs from the vehicle's leaning capabilities. Thus, there is no relationship between the steering system/inputs and the lean of the chassis.

Figure 14:
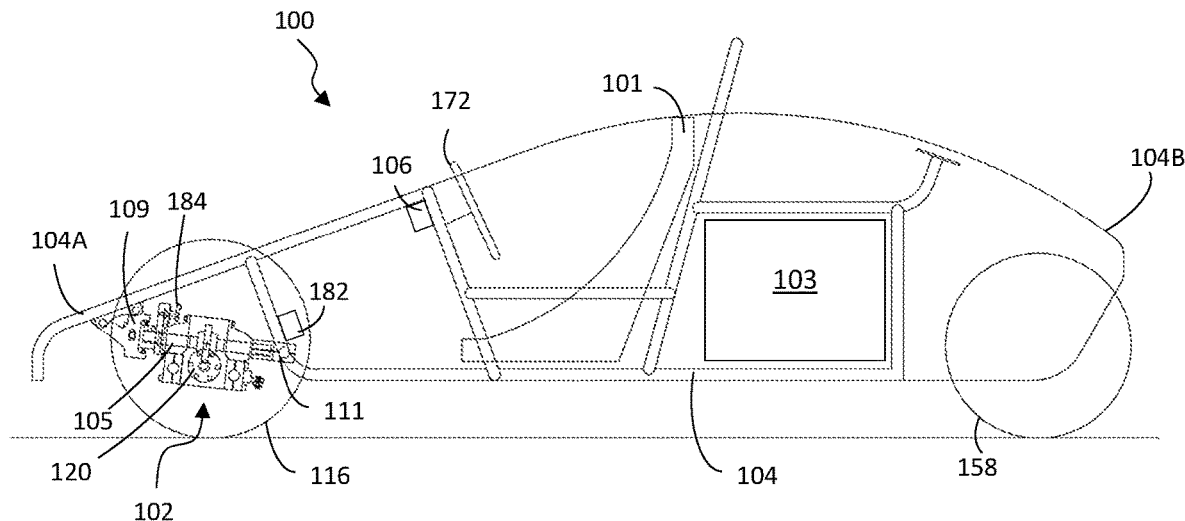
FIG. 14 is a side view of an embodiment of the present invention.
Figure 15:
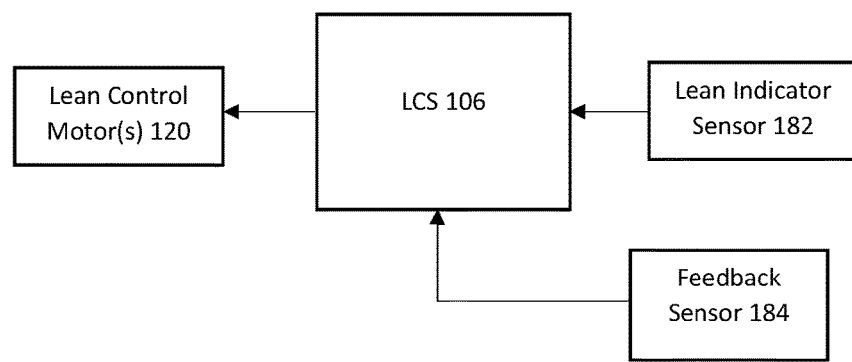
FIG. 15 is a block diagram of an embodiment of the lean control system.

As provided in FIGS. 14 and 15, some embodiments of the present invention include lean control system (LCS) 106 configured to automatically lean/rotate chassis 104 in response to a lateral force imposed on chassis 104. LCS 106 can be embodied as a computer device, special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compacts disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

LCS 106 is in direct or indirect communication (wired or wireless) with lean control motor(s) 120 and lean indicator sensor 182. More specifically, LCS 106 receives information from lean indicator sensor 182 regarding the forces imparted on trike 100 and directs lean control motor(s) 120 to lean chassis 104 as needed to improve the handling capabilities of trike 100.

LCS 106 may control a single motor 120, two lean control motors 120, or a plurality of lean control motors 120. When a single lean control motor is used, LCS 106 causes lean control motor 120 to rotate RCS 105 in a predetermined direction based on the readings received from lean indicator sensor 182. LCS 106 causes lean control motor 120 to rotate RCS 105 in the opposite direction based on the readings received from lean indicator sensor 182. If multiple lean control motors are used, LCS 106 can use more than one motor to rotate RCS 105 in either direction, can use one motor to slow or stop rotation of RCS 105, and/or can use one motor to reverse rotation of RCS 105.

Lean indicator sensor 182 includes one or more sensors configured to detect lateral forces and/or the resultant force on trike 100. A resultant force is the combination of the force of gravity with one or more additional forces imposed on trike 100. The resultant force is equal to the gravitational force when no additional forces are imposed on trike 100. When a lateral force is imposed on trike 100, the direction of the resultant force is shifted out of alignment with the direction of gravity.

Sensor system 182 may include an inclinometer, tilt indicator, tilt sensor, tilt meter, slope alert, slope gauge, gradient meter, gradiometer, level gauge, level meter, declinometer, roll indicator, or any other sensor known to a person of ordinary skill in the art to detect the resultant force on trike 100. In some embodiments, sensor system 182 is also configured to identify the direction of the resultant force with respect to normal plane 108 of chassis 104 and convey that information to LCS 106.

For example, some embodiments of lean indicator sensor 182 are configured to output a voltage to LCS 106 between a predetermined voltage range based on the readings of the one or more sensors. In an embodiment a sensor has an output voltage range from 0 to 5 volts with 2.5 volts corresponding to the resultant force aligned with normal plane 108. If lean indicator sensor 182 detects a resultant force angled towards, for example the port side of trike 100, an output voltage between 0 and 2.5 is sent to LCS 106, where the particular voltage value is based on the angle of the resultant force relative to normal plane 108. If lean indicator sensor 182 detects a resultant force angled towards the opposite side (starboard side in this example) of trike 100, an output voltage between 2.5 and 5 is sent to LCS 106, where the particular voltage value is based on the angle of the resultant force relative to normal plane 108.

LCS 106 is configured to associate the received voltage from lean indicator sensor 182 with a particular degree of rotation of RCS 105. Since RCS 105 is controlled via lean control motors 120, LCS 106 is configured to associate the received voltage from lean indicator sensor 182 with a particular degree of rotation of one or more lean control motors 120. Moreover, LCS 106 is configured to have a predetermined power curve for operation of the one or more lean control motors 120 to ensure a steady rotation to various degrees of rotation.

Some embodiments also include lean limiters configured to stop the rotation of RCS 105 at a predetermined degree of rotation. The lean limiters ensure that chassis 104 does not rotate to a degree in which rear wheel 158 loses traction with the ground. In some embodiments, the lean limiters prevent rotation beyond 45 degrees in the clockwise and 45 degrees in the counterclockwise direction. In other words, lean limiters restrict the total rotation, from one stop to the other, to a combined 90 degrees of rotation. In some embodiments, the lean limiters prevent rotation beyond 38 degrees in a clockwise and 38 degrees in a counterclockwise direction. In some embodiments, the lean limiters are adjustable to account for different rear wheel sizes and shapes.

In some embodiments, lean limiters are mechanical stops on RCS 105, worm gear assembly 124, and/or lean control motors 120. In some embodiments, the lean limiters are software/circuitry based controls. LCS 106 can be configured to identify the degree of rotation of RCS 105 with respect to vertical reference axis 107, normal plane 108, and/or the combination of the two and stop rotation at the predefined rotational limits. LCS 106 may also rely on input from the various sensors described herein to determine whether RCS 105 has reached the predetermined rotation limits.

During operation, LCS 106 is constantly adjusting RCS 105 based on the readings from lean indicator sensor 182. When trike 100 is stationary or when traveling in a straight line without any external lateral forces, LCS 106 keeps chassis 104 in an upright vertical orientation as exemplified in FIG. 2. When trike 100 is subject to centrifugal forces or any other lateral/non-vertical force, LCS 106 will detect the direction of the resultant force on trike 100 and rotate chassis 104 into the force as exemplified in FIGS. 3 and 4.

In some embodiments, LCS 106 rotates chassis 104 to align normal plane 108 with the direction of the detected force imparted on chassis 104. Thus, as shown in in FIG. 3, when LCS 106 detects a resultant force imposed on trike 100 at a 20-degree angle from the vertical reference axis 107 or normal plane 108, LCS 106 causes lean control motor(s) 120 to rotate RCS 105 and in turn chassis 104 to align normal plane 108 with the 20-degree angle of the resultant force. As shown in FIG. 4, when the angle of the detected resultant force on chassis 104 is greater than or equal to 45 degrees (assuming 45 degrees from vertical reference axis 107 is the lean limit), chassis 104 is rotated to bring reference plane 108 to a 45-degree rotation with respect to vertical reference axis 107. LCS 106 continues to monitor the angle of the resultant force and causes rotation of RCS 105 to align normal plane 108 with the angle of the resultant force on trike 100.

Some embodiments include feedback sensor 184 in communication with LCS 106. Feedback sensor 184 is configured to determine whether RCS 105 has been properly rotated to align normal plane 108 with the angle of the resultant force on trike 100. In some embodiments, feedback sensor 184 is secured to front wheel assembly 102 and operably engages RCS 105 to determine the degree of rotation of RCS 105. In some embodiments, feedback sensor 184 is secured to front wheel assembly 102 and operably engages chassis 104 and/or RCS 105 to determine the degree of rotation of chassis 104/RCS 105.

In some embodiments, feedback sensor 184 is a rotary sensor configured to detect the current rotational position of chassis 104/RCS 105. Some embodiments use a linear sensor or potentiometer. Alternative sensors known to a person of ordinary skill can be used as feedback sensor 184.

Some embodiments include a ground slope sensor in communication with LCS 106. The ground slope sensor is configured to determine when front wheel assembly 102 rotates with respect to vertical reference plane 107 as a result of the slope/camber of the ground. The ground slope sensor conveys the angle of rotation/slope of front wheel assembly 102 to LCS 106 and LCS 106 factors this rotation into the rotation of RCS 105 and in turn chassis 104.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:
1. A three wheel motor vehicle, comprising:
   a chassis, the chassis:
      having a front end and a rear end;
      providing structural support for a motor, and vehicle controls;
      a rotational control shaft proximate the front end of the chassis, the rotational control shaft having a rotational axis that is directionally oriented along a path generally extending from the front end of the chassis to the rear end of the chassis;
   a rear wheel operably connected to the chassis;
   a front wheel assembly, the front wheel assembly having:
      a pair of wheels;
      a support structure extending between the pair of wheels; and
      a first lean control motor operably connected to or integrated with the rotational control shaft of the chassis, such that actuation of the first lean control motor causes rotation of the chassis about the rotational axis of the rotational control shaft;
  wherein the first lean control motor is configured to prevent rotation of the rotational control shaft without input from the first lean control motor.

2. The vehicle of claim 1, wherein the rotational axis of the rotational control shaft is directionally oriented such that the rotational axis intersects a ground surface at or before an area of contact of the rear drive wheel with the ground surface.

3. The vehicle of claim 1, wherein the first lean control motor is a rotational motor having a rotational shaft, wherein the rotational shaft of the first lean control motor is mechanically connected to or integrated with the rotational control shaft of the chassis.

4. The vehicle of claim 1, further including a worm drive gear assembly structurally supported by the front wheel assembly, the worm drive gear assembly including:
  a first input shaft operably connected to the first lean control motor;
  an output shaft operably connected to the rotational control shaft of the chassis;
  the first input shaft operably coupled with the output shaft via a worm screw meshed with a worm wheel;
  whereby operation of the first lean control motor causes rotation of the first input shaft and in turn causes rotation of the output shaft and the rotational control shaft of the chassis.

5. The vehicle of claim 4, wherein the worm drive gear assembly further includes:
  a second input shaft operably connected to a second lean control motor;
  the second input shaft operably coupled with the output shaft via the worm screw meshed with the worm wheel;
  whereby operation of the second lean control motor causes rotation of the second input shaft and in turn causes rotation of the output shaft and the rotational control shaft of the chassis.

6. The vehicle of claim 1, further comprising a lean control system, the lean control system including:
  a lean indicator sensor, the lean indicator sensor:
    calibrated to identify a normal plane of the chassis, wherein the normal plane extends from a bottom to a top of the chassis and is perpendicular to a lateral axis of the chassis;
    configured to detect a resultant force on the vehicle that is not parallel to the normal plane;
  control circuitry configured to read the outputs from the lean indicator sensor and control the operation of the first lean control motor;
  wherein the control circuitry can determine the direction of the resultant force on the vehicle based on the outputs from the lean indicator sensor;
  in response to detecting that the resultant force on the vehicle is not parallel to the normal plane, the control circuitry is configured to cause the first rotational motor to rotate the rotational control shaft to rotate the chassis and its normal plane into parallel alignment with the resultant force.

7. The vehicle of claim 1, further including a cable steering system, the cable steering system having:
  a steering wheel;
  a steering cable operably connected to the steering wheel and to one or more of the front wheels;
  whereby input from the steering wheel causes the one or more front wheels to pivot about a respective king pin.

8. The vehicle of claim 1, further including each front wheel secured to the front wheel assembly by a king pin, wherein the kingpin has a longitudinal axis that is offset between 0 and 5 degrees from a vertical axis.

9. The vehicle of claim 8, further including a suspension system operably coupled to the front wheel assembly, wherein the suspension system has a shock absorber with a longitudinal axis that is offset between 20 and 25 degrees from the vertical axis.

10. The vehicle of claim 1, wherein the front wheel assembly includes a first beam and a second beam operably coupled to the two front wheels, wherein the first beam is vertically spaced from the second beam.

11. The vehicle of claim 1, wherein the front wheels are wider and flatter than the rear wheel.

12. A three wheel vehicle, comprising:
  a chassis, the chassis:
    having a front end and a rear end;
    providing structural support for a motor and vehicle controls;
    a rotational control shaft proximate the front end of the chassis, the rotational control shaft having a rotational axis that is directionally oriented along a path generally extending from the front end of the chassis to the rear end of the chassis;
  a rear wheel operably connected to the chassis;
  a front wheel assembly, the front wheel assembly having:
    a pair of wheels;
    a support structure extending between the pair of wheels;
    wherein the pair of front wheels are wider and flatter than the rear wheel;
  a first lean control motor operably coupled to the rotational control shaft of the chassis, such that actuation of the first lean control motor causes rotation of the chassis about the rotational axis of the rotational control shaft.

13. The vehicle of claim 12, further including:
  a lean control system, the lean control system including:
    a lean indicator sensor, the lean indicator sensor:
      configured to detect a resultant force on the vehicle that is not parallel to a normal plane, wherein the normal plane extends from a bottom to a top of the chassis and is perpendicular to a lateral axis of the chassis;
    control circuitry configured cause the first rotational motor to rotate the rotational control shaft to bring the normal plane of the chassis into parallel alignment with the resultant force.

14. The vehicle of claim 12, wherein the rotational axis of the rotational control shaft is directionally oriented such that the rotational axis intersects a ground surface at or before an area of contact of the rear wheel with the ground surface.

15. The vehicle of claim 12, wherein the first lean control motor is a rotational motor having a rotational shaft, wherein the rotational shaft of the first lean control motor is mechanically connected to or integrated with the rotational control shaft of the chassis.

16. The vehicle of claim 12, further including a worm drive gear assembly structurally supported by the front wheel assembly, the worm drive gear assembly including:
  a first input shaft operably connected to the first lean control motor;
  an output shaft operably connected to the rotational control shaft of the chassis;
  the first input shaft operably coupled with the output shaft via a worm screw meshed with a worm wheel;

whereby operation of the first lean control motor causes rotation of the first input shaft and in turn causes rotation of the output shaft and the rotational control shaft of the chassis.

17. The vehicle of claim 16, wherein the worm drive gear assembly further includes:
a second input shaft operably connected to a second lean control motor;
the second input shaft operably coupled with the output shaft via the worm screw meshed with the worm wheel;
whereby operation of the second lean control motor causes rotation of the second input shaft and in turn causes rotation of the output shaft and the rotational control shaft of the chassis.

18. The vehicle of claim 12, further including a cable steering system, the cable steering system having:
a steering wheel;
a steering cable operably connected to the steering wheel and to one or more of the front wheels;
whereby input from the steering wheel causes the one or more front wheels to pivot about a respective king pin.

19. A front wheel assembly for a motor vehicle, comprising:
a rotational control shaft configured to be mechanically secured to a chassis in a generally non-rotational manner, such that rotation of the rotational control shaft causes rotation of the chassis when the rotational control shaft is secured to the chassis;
the rotational control shaft having a rotational axis that is directionally oriented along a path generally extending in a forward to rearward direction when the rotational control shaft is secured to the chassis;
a support structure extending in generally a lateral direction with respect to the rotational control shaft, wherein the support structure is configured to be operably secured to a pair of front wheels; and
a first lean control motor operably coupled to the rotational control shaft of the chassis, such that actuation of the first lean control motor causes rotation of the chassis about the rotational axis of the rotational control shaft, wherein the first lean control motor is configured to prevent rotation of the rotational control shaft without input from the first lean control motor.

* * * * *